(12) United States Patent
Katz (10) Patent No.: US 7,492,251 B1
(45) Date of Patent: Feb. 17, 2009

(54) DUAL MODE PERSONAL LOCATOR BEACON

(75) Inventor: Daniel A. Katz, 87 Tzahal St., Kiryat Ono (IL) 55451

(73) Assignee: Daniel A. Katz, Kiryat-Ono (IL)

( * ) Notice: Subject to any disclaimer, the term of this patent is extended or adjusted under 35 U.S.C. 154(b) by 0 days.

(21) Appl. No.: 12/202,357

(22) Filed: Sep. 1, 2008

(51) Int. Cl.
*G08B 1/08* (2006.01)
*H04B 7/185* (2006.01)
*G01S 5/00* (2006.01)
*B60Q 1/00* (2006.01)

(52) U.S. Cl. ............................ 340/539.22; 340/539.11; 340/539.13; 342/357.07; 342/357.09; 342/457; 455/404.2; 455/13.4; 455/90.1

(58) Field of Classification Search ............ 340/539.22, 340/539.11, 539.13; 342/357.07, 357.09, 342/457; 455/404.2, 13.4, 90.1
See application file for complete search history.

(56) References Cited

U.S. PATENT DOCUMENTS

| 5,355,140 | A | 10/1994 | Slavin et al. |
|---|---|---|---|
| 5,367,306 | A | 11/1994 | Hollon et al. |
| 5,414,432 | A | 5/1995 | Penny, Jr. et al. |
| 5,461,365 | A | 10/1995 | Schlager et al. |
| 5,517,199 | A | 5/1996 | DiMattei |
| 6,362,778 | B2 | 3/2002 | Neher |
| 6,388,617 | B1 | 5/2002 | Flood et al. |
| 6,545,606 | B2 | 4/2003 | Piri et al. |
| 6,992,623 | B2 | 1/2006 | Street |
| 7,366,483 | B2 * | 4/2008 | Liu .......................... 455/127.1 |
| 7,394,384 | B2 | 7/2008 | Rainczuk et al. |
| 2003/0162508 | A1 | 8/2003 | Macias |
| 2004/0121782 | A1 * | 6/2004 | Tester ....................... 455/456.1 |
| 2005/0079887 | A1 * | 4/2005 | Haim .......................... 455/522 |
| 2006/0007038 | A1 | 1/2006 | Boling et al. |
| 2006/0196499 | A1 | 9/2006 | Cannizzaro |
| 2007/0030156 | A1 | 2/2007 | Schlager et al. |

FOREIGN PATENT DOCUMENTS

| GB | 2430064 B2 | 3/2007 |
|---|---|---|
| WO | WO03089953 B2 | 10/2003 |

\* cited by examiner

*Primary Examiner*—Donnie L Crosland (57) ABSTRACT

A Personal Locator Beacon (PLB), supporting two operation modes local monitoring and remote monitoring. The apparatus includes a PLB that supports the present operation mode, as well as a local monitoring mode, employing the same transmitter, and automatically switching between modes. Upon activation, the PLB first tries to communicate with a local monitoring station, at a low transmission power, and at a high repetition rate, in purpose of dealing with the PLB call locally, without involving the remote monitoring station. Then, if not acknowledged by a local monitoring station, the PLB increases its transmission power, enabling access to a remote monitoring station. In a preferred embodiment, the PLB is carried by a person onboard a vessel, to alarm upon a Man Overboard (MOB) accident, the local monitoring station is installed onboard the same vessel, and the remote monitoring station is part of a satellite Search and Rescue (SAR) system, as Cospas-Sarsat.

20 Claims, 5 Drawing Sheets

Overview of a location system
According to a preferred embodiment of the present invention Figure 1 - Overview of a location system
According to a preferred embodiment of the present invention

Figure 2 - Block Diagram of a Personal Locator Beacon (PLB) According to a preferred embodiment of the present invention

Figure 3a – Illustration of a Personal Locator Beacon (PLB) transmission (present art)

Figure 3b – Illustration of a Personal Locator Beacon (PLB) transmission (first embodiment of invention - no LMS control)

Figure 3c – Illustration of a Personal Locator Beacon (PLB) transmission (first embodiment of invention - LMS controlled)

Figure 4 - Block Diagram of a Locator Beacon ("PLB")
According to a second embodiment of the present invention Figure 5a – Illustration of a Personal Locator Beacon (PLB) transmission (present art)

Figure 5b – Illustration of a Locator Beacon ("PLB") transmission (second embodiment of invention)

DUAL MODE PERSONAL LOCATOR BEACON

BACKGROUND OF THE INVENTION

The present invention relates to wireless location systems, particularly for locating persons in distress or emergency situations.

Though the scope of the present invention is far beyond a specific system or a specific application, it may be well understood by elaborating on the case of man overboard (MOB), i.e. a person that accidentally falls overboard a vessel to the sea (or ocean, or lake, or river, etc.).

Over a thousand people are lost at sea every year due to MOB accidents. Fast detection and location of such accidents is crucial, since survival time in water is limited, typically less than two days at −20° C. and less than 6 hours at −10° C.

A reliable device to detect and locate MOB is required to save lives, but also to provide the sailor with confidence and peace of mind, as well as reducing costs and risks of Search and Rescue (SAR) operations.

The present art provides a reasonable solution for locating ships in danger of being wrecked, airplanes upon emergency landings, and in many cases also individuals in distress. This is typically accomplished by activating emergency radio beacons, detectable and locatable by satellites orbiting around the earth. Still, present SAR systems are less efficient for individuals, specifically MOB.

A major satellite SAR system presently operating worldwide is Cospas-Sarsat. Though the present invention is not limited to this specific system, Cospas-Sarsat is a good example to clarify the present art, as well as the present invention, so it is specifically enlightened here.

Cospas-Sarsat is a satellite communications system to assist SAR of people in distress, all over the world and at anytime. The system was launched in 1982 by the USA, Canada, France and the Soviet Union (Russia) and since then, it has been used for thousands of SAR events and has been instrumental in the rescue of over 20,000 lives worldwide. The goal of the system is to detect and locate signals from distress radio beacons and forward the data to ground stations, in order to support all organizations in the world with responsibility for SAR operations, whether at sea, in the air or on land.

The system uses spacecraft—Low Earth Orbit (LEO) and Geostationary (GEO) satellites; and in the future also Medium Earth Orbit (MEO) satellites; Cospas-Sarsat radio beacons transmit in the 406 MHz band (and 121.5 MHz until 2009). The position of the beacon is determined either by the Doppler shift of the received beacon signal or by position data modulated on the signal, provided by a Global Navigation Satellite System (GNSS) receiver integrated in the radio beacon.

A detailed description of the Cospas-Sarsat System is provided in the document "Introduction to the Cospas-Sarsat System, C/S G.003", accessed through—http://cospas-sarsat.org/Documents/gDocs.htm All Cospas-Sarsat beacons are subject to the same RF specifications, yet may employ a different mechanical structure and different activation method, possibly also slight differences in the data modulated on the signal, usually adopted to different applications, and named accordingly: a) Emergency Position Indicating Radio Beacon (EPIRB) for marine use; b) Emergency Locator Transmitter (ELT) for aviation use; and c) Personal Locator Beacon (PLB) for personal and/or terrestrial use. For the purpose of the present invention, the name "PLB" is mainly used, however it refers to any type of radio location beacon (not necessarily related to "persons").

When activated, automatically or manually, a Cospas-Sarsat beacon transmits short signals, each about 0.5 seconds long, repetitively every 50 seconds, for at least a day, until its battery drains out.

Cospas-Sarsat beacons are already mandatory to carry onboard large ships (>300 Ton) and passenger airplanes. In several countries, also leisure yachts are required to carry such beacons.

There are various products in the market that implement Cospas-Sarsat specified beacons, for example: "ResQFix" provided by ACR (www.acrelectronics.com); "fastfind" provided by McMurdo (www.mcmurdo.co.uk); "SA50' provided by SIMRAD (www.simradyachting.com).

Still, the problem of man overboard, which is very troublesome in the maritime arena, is not covered well enough by present art, including by present Cospas-Sarsat beacons. Since a MOB accident can happen anytime, an effective MOB device should be always carried by a person onboard, at sea, preferably worn on the body. Indeed, such wearable MOB radio beacons were been introduced to the market, for example: "LIFETAG" by Raymarine (www.raymarine.com); "WAVEFINDER" provided by Viking Life (www.viking-life.com); "MOB i-lert" provided by Ocean Safety (www.oceansafety.com), yet, these are not satellite compatible beacons, but rather short range transmitters to communicate with a receiver onboard the vessel. Some of these MOB systems can accurately record the time and position of a MOB accident, however as the vessel sails away, and turns back to the recorded MOB position, or a SAR team is dispatched to this last reported location, the poor victim could have been drifted away, even by 100-200 meters, and without an accurate updated position report, it could be very difficult to locate and rescue this person in the water, particularly in poor visibility and high sea conditions.

U.S. Pat. No. 6,545,606 to Piri et al. discloses a Device and method for alerting to the need to recover something, identifying it, and determining its location for purposes of recovery. This invention discloses a man overboard beacon, still a low power transmitting beacon (less than 15 mw in average) which is not configured to communicate with satellites.

U.S. Pat. No. 6,362,778 to Neher discloses a Personal location detection system. This invention does not disclose location methods for men overboard, and the disclosed beacon is neither configured to reach any communication satellites.

U.S. patent application 20060196499 to Cannizzaro; Kenneth Peter discloses a Scuba diver surface location, navigational and communication device and method. The disclosed device is configured to operate on local VHF networks, not with communication satellites or in a wide area network. If wearing or carrying a satellite detectable beacon, the MOB could be located accurately, by Cospas-Sarsat for example, but this information is usually not communicated to the very vessel from which the person fell overboard. This is a problem, since in case that a vessel is in the open sea, away from shore, the vessel from which a man fell overboard is the most relevant source for swift and effective rescue.

Thus, it is mostly desirable to receive onboard the vessel updated location reports from a MOB.

Yet, it is also desirable to communicate such updated location reports from a MOB to the satellite SAR system, since the MOB vessel is not always available for rescue, as in case of a single handed vessel, when persons onboard are not capable of rescuing the MOB (e.g. if the skipper fell overboard), when the vessel itself is in trouble (e.g. fire, wrecking), etc.

Apparently, incorporating present satellite beacons with present wearable MOB devices, could lead to the required solution, i.e. a wearable beacon detectable by both the satellites and the vessel.

Further, such an incorporated system seems straight forward to achieve by shrinking the size of present satellite PLBs, and installing an onboard receiver similar to those carried by Cospas-Sarsat satellites.

But such an efficient dual mode MOB system is not straight forward, for several reasons.

One reason is that design considerations good for few satellite receivers (actually, satellites usually carry transponders, and much of the receiving process is done on earth) are not optimal for mass production receivers to be installed onboard ships, and unlike satellites, the vessel receiver may lack a line of site with an MOB transmitter.

Aspects related to a receiver onboard a vessel configured to detect a satellite compatible MOB transmitter were already considered by the applicant, who proposed a method for "Determining Precise Direction and Distance to a Satellite Radio Beacon", U.S. patent application Ser. No. 11/836,783, filed on 10 Aug. 2007.

Another reason for this non trivial incorporation is that current satellite PLB antennas are difficult to be conveniently worn by humans, while providing a good RF performance. A worn antenna should enable communicating the satellite, but disturb as less as possible the mariner, in its routine tasks, and especially when in distress.

Aspects related to a wearable antenna for a satellite compatible MOB transmitter were already considered by the applicant, who proposed a "Wrist Worn Communication Device coupled with Antenna Extendable by the Arm", U.S. patent application Ser. No. 11/938,311, filed on 12 Nov. 2007.

Then, there is the method of activation of the MOB PLB to be effectively solved. Present PLBs are usually activated manually. Obviously, a manual activation of an MOB PLB is not desirable, since the person overboard might be unable to activate the device, being unconscious, or almost frozen, or simply focused on keeping itself above the water level. Alternatively, an automatic activation could be considered, e.g. upon water sensing.

U.S. Pat. No. 5,710,989 to Flood discloses a Water-activated emergency radio beacon.

However, an automatic activation might cause many false alarms, e.g. when a person bearing the PLB innocently jumps to swim by the boat, or washes hands onboard. Furthermore, it would be desirable, that if an MOB is swiftly rescued by the vessel from which he fell overboard, the satellite system would not be alerted, in order to avoid unnecessary SAR operations directed by the satellite system operators.

It is then an object of the present invention to provide a system and device and method for MOB, enabling detecting and locating an MOB by means installed onboard a vessel, as well as by a satellite SAR system (or satellite communication system linked to SAR capable teams).

It is also an object of the present invention to provide a system and device and method for MOB, enabling detecting and locating an MOB by means installed onboard a vessel, as well as by a satellite SAR system, even if that MOB is unconscious.

It is another object of the present invention to provide a system and device and method for MOB, significantly reducing the probability of alerting a satellite SAR system, if the MOB is swiftly rescued by the vessel from which he fell overboard.

It is yet another object of the present invention to provide a system and device and method for MOB, compatible with a satellite system for Search and Rescue, such as Cospas-Sarsat.

As already indicated, the present invention is not limited to the application of MOB and neither to Cospas-Sarsat or any other satellite SAR system. There are other scenarii that can benefit from the present invention, some of them are briefly described following.

In the military arena, the control over a group of soldiers, during a military operation, is paramount. It would be advantageous that if one of the soldiers is getting away from the group, undesirably, beyond a predefined range, the group commander would be alerted, and provided with this soldier last known location. Further, if this soldier is too distant from the group, it would be advantageous to report this soldier location to a remote headquarters, in order to enable the headquarters to better control the operation and assist this soldier, when required.

A similar logic may apply to a group of tourists, traveling in a foreign country, with a guide. Here, it would be desirable that the guide would be indicated that one of his group members is potentially lost, and provide the guide with the location of his lost sheep, in order to promptly get it back to the herd. However, if the tourist is too distant, e.g. left behind when the group took the bus, then it would be desirable to report its location to a remote station, e.g. the tourist office.

Naturally, the same logic applies to other applications and scenarii, where the location of an object, such as a person, but also an animal, pet, or valuable, is to be monitored, in reference with a fixed location, such as a home or farm or schoolyard, or in reference with a moving point, such as a vehicle or a roaming group. For example, the present invention may assist in locating a senior citizen that leaves home, potentially lost, or a cow that moves away from the corrals, or a car that is unlawfully taken away from the garage.

So, it is as well an object of the present invention to provide a system and device and method for location of an object, in reference with a predefined place, or in reference with a moving point.

It is still an object of the present invention to provide a system and device and method for location of objects such as: person, animal, pet, vehicle, weapon, ammunition, valuable asset.

One requirement which is common to the above mentioned cases of MOB and soldiers and tourists and so on, is that their location should preferably be first locally monitored, accordingly by the vessel, the commander and the tourist guide, and if successfully located at this stage, it is desirable to avoid alerting the remote station, accordingly the satellite SAR system, the military headquarters and the tourist office, as if already treated locally, it is a false alarm for the remote station.

Then, it is also an object of the present invention to provide a system and device and method for location of objects, first by a local monitoring station, and otherwise by a remote monitoring station.

So it is still another object of the present invention to provide a system and device and method for location of objects, reducing the false alarm rate at a remote monitoring station.

For MOB, an automatic activation of the location beacon is paramount, but this is also relevant to other applications, as the soldier and tourist, and is certainly relevant to a lost animal or stolen car.

So, it is nonetheless an object of the present invention to provide a system and device and method for location of objects, with an automatic activation of the device attached to the object.

Other objects and advantages of the invention will become apparent as the description proceeds.

SUMMARY OF THE INVENTION

The invention is directed to a location system, comprising a Personal Locator Beacon (PLB), a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:
 a) transmit a first group of said successive signals, upon activation, at a low transmission power and at a high repetition rate, said low transmission power configured to enable determining the PLB location at the LMS but not at the RMS;
 b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS;

As a skilled person may appreciate, the present invention is particularly relevant when the LMS is in a better position to detect the PLB transmission, than the RMS is, at the time the PLB is activated. This can be due to a short distance between the PLB and LMS, relatively to a long distance between the PLB and the RMS, at the time of PLB activation. Yet, usually, though the LMS is provided with means to directly detect the PLB wireless transmissions, the RMS does not directly receive the PLB signals, but through relay stations which are part of a communications network, typically a Wide Area Network (WAN) such as a cellular network, or preferably, one or more satellites orbiting above the globe. So, for example, when a PLB is activated a few meters from a compatible LMS, while the RMS is configured to be accessed by the PLB via a MEO satellite orbiting about 20,000 Kms above the earth, it is most probable that the LMS would be in a better position to detect the PLB signals (unless there is a huge difference in sensitivity between the LMS receiver and the receiver/transponder mounted on the MEO satellite, which is typically not the case), and it is therefore logically that a relatively low power signal could reach the LMS, but not the RMS.

The activation of the PLB, i.e. triggering the PLB to start transmitting said successive signals, may be done manually, by a human user, however preferably automatically, by a water detecting sensor, comprised in or coupled to the PLB. Alternatively, one or several other sensors may be used for PLB activation, typically sensitive to one or more environmental changes, such as: temperature; humidity; acceleration; PH; air pressure; water pressure; illumination; sound; position; electromagnetic radiation; such a triggering change in an environmental parameter reading may be defined relatively to a previous reading at the PLB or relatively to a reading at the LMS, which is communicated to the PLB by means described later.

Upon activation, the PLB is configured to start transmitting a first sequence of signals at a low power and high repetition rate, in order to hopefully be swiftly detected by the LMS without alarming the RMS. Then, typically if not detected by the LMS, the PLB is configured to switch to a second mode, transmitting a second group of successive signals, at a high transmission power detectable by the RMS.

Possibly, among this first group of successive signals, at least one signal is configured to be transmitted at a higher transmission power compared to a previously transmitted signal. This way, there is a fair chance that the LMS will still detect the PLB signals, even if the distance between the PLB and LMS increases in time. On the other hand, the signal transmission power is not increased too early, in order to save battery power at the PLB.

As a person skilled in the art may appreciate, there are various ways in which the LMS and RMS can determine the location of the PLB using data derived from the PLB signals. The Cospas-Sarsat SAR satellite system employs two location methods: a) by determining the Doppler shift of the detected PLB signal; b) by reading the position data modulated on the PLB signal. This second method for location is preferably employed by the present invention, so preferably, the PLB further comprises or is coupled to a Global Navigation Satellite System (GNSS) decoder, and the PLB is configured to acquire position data from this decoder, and reflect said position data in the transmitted signals, in addition to identity data related to the PLB. As a skilled person probably appreciates, GNSS is usually a general term, as well as GPS (Global Positioning System) and SPS (Satellite Positioning System) and SNS (Satellite Navigation System); these acronyms may relate to particular systems such as the USA GPS or the Russian GLONASS or the European GALILEO. In the scope of the present invention, unless referring to a specific system, the terms GNSS and/or GPS are usually used relating to a general satellite navigation system.

Having a GNSS decoder coupled to the PLB enables to acquire the PLB speed, in addition to its current position. Then, it is possible to refine the PLB transmission power strategy, particularly among the first group of successive signals. Preferably, among the first group of successive signals, at least one signal is configured for a higher transmission power compared to a previously transmitted signal, and the difference between the transmission power of these couple of signals is larger as the PLB speed is higher.

Another potential use for the GNSS decoder at the PLB is communicating an acknowledgment from the RMS to the PLB. This can be accomplished if the SAR Satellite System which the RMS is part of, is linked to the GNSS. This is the case with Galileo, the European GNSS, which by the time the present invention is filed is on its way but not operational yet. Galileo MEO satellites are configured to carry Cospas-Sarsat payloads (transponders), in addition to navigation payloads (transmitters). Then, a Galileo satellite that detects an active Cospas-Sarsat PLB, could acknowledge this PLB transmission by communicating a proper message through the GNSS (Galileo) decoder embedded in this PLB. So the present invention proposes acknowledging a PLB transmission by the RMS (either by a machine or a human operator), or by parts of the communications network linked to the RMS, particularly by a satellite.

Upon receiving an acknowledgement from the RMS, the PLB may further be configured to decrease the transmission repetition rate of successive signals, even bellow the currently set low repetition rate. This still enables updating the PLB position at the RMS, yet since the PLB was already detected, it could be desirable to trade off the position update rate with longer PLB battery life, utilizing the residual battery energy to transmit the same number of signals but spread over a longer time.

As a skilled person may appreciate, it would be desirable to be able to deactivate the PLB, i.e. cause it to cease transmitting, upon been detected and located by the LMS and after concluding the operation related with this location, e.g. rescue a lost person (or upon a false alarm). If this deactivation is conducted early enough, then the RMS would not be alerted, saving much efforts, cost and danger associated with a SAR operation directed by the RMS. It is possible to provide the PLB with an input enabling the user with a momentarily deactivation, preventing a permanent deactivation to be unintentionally invoked. Yet preferably, the present invention proposes a wireless remote control deactivation, directed from the LMS. It is assumed that an LMS operator is usually in a better condition to wisely operate the system, than a person bearing the PLB, often in distress. Therefore, the PLB preferably comprises a control receiver, and the LMS further comprises a compatible control transmitter, to control the PLB. These control signals may be employed for deactivating and/or activating the PLB, or for controlling PLB parameters such as the transmission power and repetition rate, or for acknowledging the PLB transmission (which can significantly encourage the PLB bearer). This wireless link between the LMS and the PLB may also be employed for providing the PLB with information about the LMS status, to enable activation of the PLB according to a differential reading of a parameter, e.g. the position of the LMS compared to the position of the PLB. It is also possible to configure the LMS to relay control signals from the RMS, to the PLB, via this control link.

The LMS control transmissions to the PLB are preferably triggered manually, by a human operator, e.g. remotely deactivating a PLB, but may be also triggered automatically, either routinely, or upon detecting a PLB signal, or upon sensing an environmental change at the LMS, etc.

Upon deactivation, the PLB is preferably configured to disable its next activation for a predefined period of time, in order to avoid false alarms.

Having a control receiver and a GNSS decoder at the PLB, and the LMS configured to transmit its position coordinates to the PLB, enables a further refinement of the PLB transmission power strategy, among the first group of successive signals. Then, it is possible that at least one signal be configured for a higher transmission power compared to a previously transmitted signal, and the difference between the transmission power of these couple of signals be larger as the speed of separation between the PLB and LMS is higher.

In a preferred embodiment of the present invention, the PLB is a distress radio beacon, wherein the signals in the second group of successive signals are compatible with the Cospas-Sarsat satellite Search and Rescue (SAR) system, as required from a Cospas-Sarsat Personal Locator Beacon (PLB) or Emergency Position Indicating Radio Beacon (EPIRB) or Emergency Locator Transmitter (ELT). Naturally, the disclosed PLB signals are preferably set to the 406 MHz band. Then, the RMS is preferably a Cospas-Sarsat ground monitoring station, in terms of Cospas-Sarsat it is a Mission Control Center (MCC) or Rescue Coordination Center (RCC).

Further, the PLB is preferably configured to be carried by or attached to a person onboard a vessel and the LMS configured to be installed onboard the same or another vessel or another type of craft (e.g. a SAR helicopter); then, the PLB is configured to be automatically activated when said person falls overboard, and upon activation, the PLB is configured first to try notifying the LMS, at a low transmission power, then, in due time, increase the transmission power in order to communicate with the RMS, via a satellite orbiting around the globe.

The PLB may further comprise a man-machine interface (MMI), enabling a user to input commands to the PLB, and the PLB to output status indications to a user. The preferred embodiment of the invention is related to SAR, so it is paramount to provide a PLB simple as possible for operation. In this context, the PLB is preferably configured to operate automatically, even if its bearer is unconscious, so for operational purposes, no user input is configured, particularly avoiding any kind of deactivation control that might be undesirably invoked. Then, a few outputs are preferably provided, indicating: i) whether the PLB is activated or not; ii) when the PLB is about to transmit and when the PLB is actually transmitting, iii) acknowledgement of a PLB transmission received from an RMS or an LMS. The preferred embodiment provides also an interface for testing and maintenance purposes.

For maintenance, the control receiver may also be used. Preferably, upon activation, the PLB is configured to receive control signals that deactivate its transmission and put it in maintenance mode, enabling at least one of: a) downloading a software version; b) programming identity data; c) setting specific operational parameters; d) performing a test.

It is also possible to configure the PLB to change its transmission frequency, for transmitting different signals. Preferably, the PLB is configured to automatically change its transmission channel, every predefined period of time (e.g. every hour), switching among a preset group of channels in the 406.0-406.1 MHz band, in a cyclic way. In addition, it is possible to use different RF frequencies for the different groups of signals. Since the second group signals are typically transmitted on licensed frequencies, which are subject to strict regulations, it might not be possible, due to regulation reasons, to use the same frequencies for the first group signals, which should be transmitted at a lower transmission power according to the present invention. On one hand, this could be allowed, since FCC/ETSI regulations typically limit the maximum transmission power, however on the other hand, this might not be approved by the satellite / WAN operators, e.g. Cospas-Sarsat that defines also a minimum limit to the transmission power. So, in case of such a regulatory issue, a different frequency is configured for the first group signals, preferably an unlicensed frequency. Still, selecting close frequencies for the two groups of signals enables using the same PLB hardware, including the transmitter and the antenna, as well as the same receiver and antenna hardware for the LMS.

Although according to the preferred embodiment of the invention the PLB is attached to a person, in other embodiments, the PLB may be attached to other objects to be located, such as an animal, a pet, vehicle, weapon, ammunition, valuable asset, etc.

The invention is further directed to a Personal Locator Beacon (PLB), for a location system comprised of said PLB, a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:

a) transmit a first group of said successive signals, upon activation, at a low transmission power and at a high repetition rate, said low transmission power configured to enable determining the PLB location at the LMS but not at the RMS;

b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS;

The invention is also directed to a method for locating a Personal Locator Beacon (PLB) by a local monitoring station (LMS) and by a remote monitoring station (RMS), comprising the steps of:
a) configuring said PLB to transmit successive signals, upon activation;
b) configuring said LMS and RMS to determine the PLB location, from data derived from said signals;
c) transmitting a first group of said successive signals, upon activation, at a low transmission power and at a high repetition rate, said low transmission power configured to enable determining the PLB location at the LMS but not at the RMS;
d) transmitting a second group of said successive signals, after transmitting said first group of said successive signals, at a high transmission power, higher than said low transmission power, and at a low repetition rate, lower than said high repetition rate, said high transmission power configured to enable determining the PLB location at the RMS;

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 2 shows a Block Diagram of a PLB according to a first (preferred) embodiment of the present invention. The figure depicts: a) a microcontroller integrated with a RAM (Random Access Memory) and EPROM (Electrically Programmable Read Only Memory), and further coupled to: b) a GPS decoder (receiver) with a matching antenna; c) a 406 MHz transmitter with a matching antenna, configured to communicate with the LMS and the RMS (both not shown); d) a control receiver with a matching antenna, configured to be communicated by the LMS (not shown); the microcontroller is also coupled to e) an Input/Output user interface; f) a water detecting sensor. In particular, the interface between the microcontroller and the 406 MHz transmitter shows a data connection and a control connection, wherein the control connection enables, among other functions, controlling the transmission power and the transmission timing.

FIG. 3a illustrates the PLB transmission according to the present art;

FIG. 3b illustrates the PLB transmission according to the first embodiment of the invention (no LMS control);

FIG. 3c illustrates the PLB transmission according to the first embodiment of the invention (controlled by the LMS);

Present art PLBs, as shown in FIG. 3a, transmit at a fixed nominal transmission power and fixed nominal time period between successive transmissions, upon activation, and typically until the battery is drained out; according to the present invention, the PLB starts transmitting at a relatively low power and high repetition rate, as shown in FIGS. 3b and 3c; then, as shown in FIG. 3b, after t1 minutes from activation, the transmission power is increased to a higher transmission power level and the transmission repetition rate is decreased to a lower repetition rate (i.e. the present art values, as shown in FIG. 3a); however, the LMS can wirelessly control the PLB, and FIG. 3c particularly shows a deactivation of the PLB, before it increases the transmission power (LMS not shown).

FIG. 4 shows a Block Diagram of a PLB according to a second embodiment of the present invention. The figure depicts: a) a microcontroller integrated with a RAM (Random Access Memory) and EPROM (Electrically Programmable Read Only Memory), and further coupled to: b) a GPS decoder (receiver) with a matching antenna; c) a satcom transmitter with a matching antenna, configured to communicate with the LMS and the RMS (both not shown); d) a control receiver with a matching antenna, configured to be communicated by the LMS (not shown); the microcontroller is also shown to obtain an interface to external devices.

In particular, the interface between the microcontroller and the satcom transmitter shows a data connection and a control connection, wherein the control connection enables, among other functions, controlling the transmission power and the transmission timing.

FIG. 5a illustrates the PLB transmission according to the present art;

FIG. 5b illustrates the PLB transmission according to the second embodiment invention;

Present art PLBs, as shown in FIG. 5a, transmit at a fixed nominal transmission power and fixed nominal time period between successive transmissions.

According to the second embodiment of the present invention, the PLB alternatively switches between two transmission modes, as shown in FIG. 5b, upon detecting or ceasing to detect the LMS (not shown) acknowledgements to the PLB transmission. The two alternate modes are configured, accordingly, to: a) low transmission power and high repetition rate; b) high transmission power and low repetition rate.

DETAILED DESCRIPTION

Figure 1:
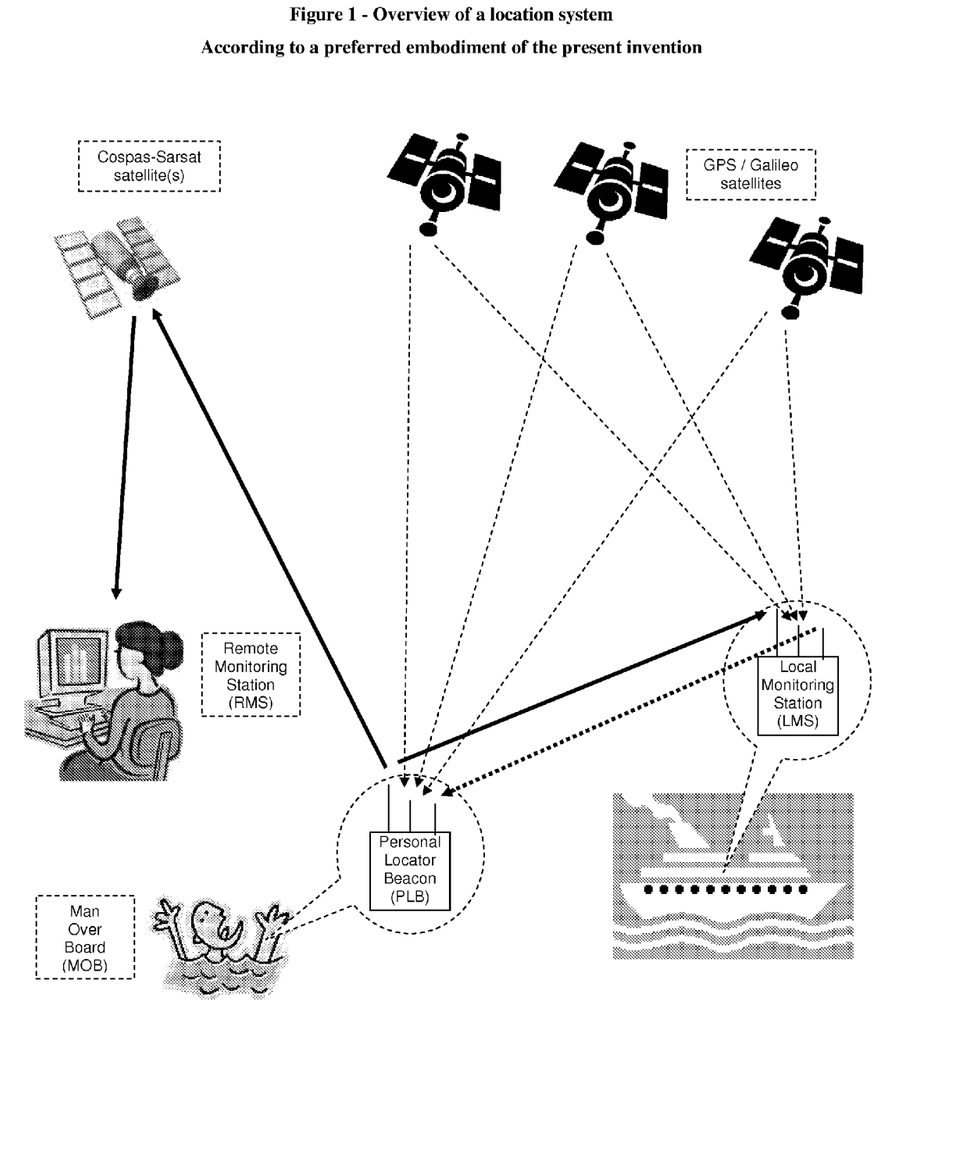
FIG. 1 shows an Overview of a location system according to a preferred embodiment of the present invention. This figure shows: a) three GPS/Galileo satellites; b) one Cospas-Sarsat satellite wirelessly linked to a remote monitoring station (RMS); c) a local monitoring station (LMS) installed onboard a vessel; d) a Personal Locator Beacon (PLB) worn on the wrist of a person fell overboard that vessel.

The present invention discloses a location system, comprising a Personal Locator Beacon (PLB), a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:
a) transmit a first group of said successive signals, upon activation, at a low transmission power and at a high repetition rate, said low transmission power configured to enable determining the PLB location at the LMS but not at the RMS;
b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS;

FIG. 1 shows an Overview of a location system according to the preferred embodiment of the present invention. This figure shows: a) three GPS/Galileo satellites representing the GNSS; b) one Cospas-Sarsat SAR satellite wirelessly linked to a remote monitoring station (RMS); c) a local monitoring station (LMS) installed onboard a vessel; d) a Personal Locator Beacon (PLB) worn on the wrist of a person fell overboard from that vessel.

As a skilled person may appreciate, the invention is particularly applicable when the PLB is first activated in a close-proximity with the LMS, yet the RMS is configured to receive the PLB signals via an access point relatively distant from the PLB, such as a satellite orbiting above the globe, as shown in FIG. 1, or a WAN base station, e.g. a cellular base station.

The presently disclosed location system will be described following, particularly for locating people, specifically in distress situations. Yet, the scope of the invention is not restricted to locating people, and is directed to locate any other object, such as animals, pets, vehicles, weapons, ammunition, valuable assets, and alike.

Description of a First (Preferred) Embodiment of the Invention

General

According to this first embodiment of the present invention, the PLB is a distress radio beacon, configured to be carried by a person onboard a vessel and be activated when said person falls overboard; the LMS is configured to be installed onboard the same vessel and other LMSs mounted on SAR helicopters, while the RMS is a Cospas-Sarsat MCC (Mission Control Center) or RCC (Rescue Coordination Center), linked to Cospas-Sarsat satellites, which are configured to detect said PLB second group signals. Accordingly, the PLB is configured to transmit its second group of signals alike a Cospas-Sarsat PLB or EPIRB or ELT.

PLB Structure

Figure 2:
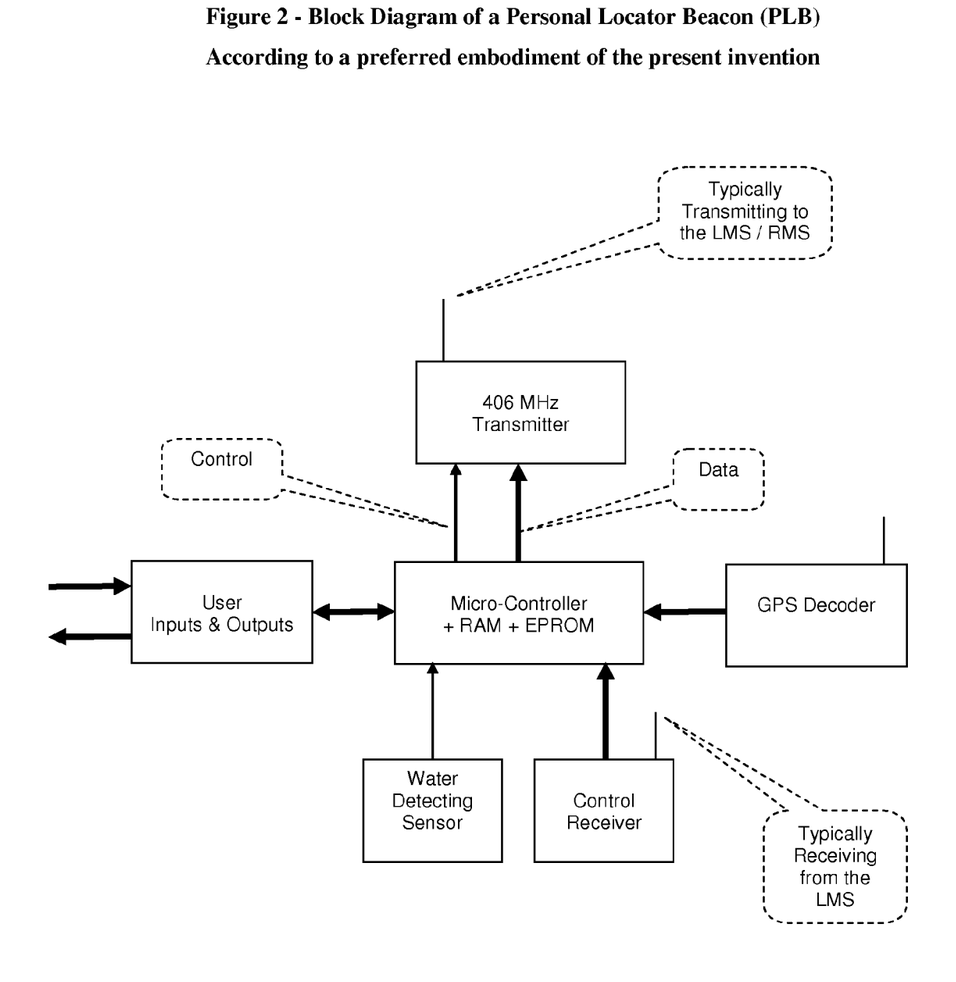

FIG. 2 shows a Block Diagram of the preferred Personal Locator Beacon (PLB). The figure depicts:
  a) a microcontroller integrated with a RAM and EPROM. Preferably, the microcontroller is one of the TI MSP430 single chip microcontrollers. Such one chip microcontrollers are well known and used in the art. Specific details are available at—http://focus.ti.com/lit/ml/slab0341/slab0341.pdf. As a skilled person may appreciate, much of the operation of the PLB is controlled by the microcontroller (running a dedicated program), including setting the transmission timing and power and controlling other parts of the PLB (detailed bellow), including the GPS decoder, the control receiver and external interfaces of the PLB.
  b) a GPS decoder (receiver) with a matching antenna. The GPS receiver is based on u-blox UBX-G5010 GPS single chip. Such chips and chipsets are well known and used in the art. A data sheet may be accessed at—http://www.u-blox.com/products/ubx-g5010.html. The GPS is coupled to the microcontroller, which is configured to prepare the data message modulated on the transmitted signal, in which the GPS location coordinates are reflected, in addition to identity data related to the PLB.
  c) a 406 MHz transmitter with a matching antenna. Such a basic transmitter is well defined by Cospas-Sarsat at—http://www.cospas-sarsat.com/DocumentsTSeries/T1NOV1_07_CompleteDoc.pdf and implementations of such transmitters are well known in the art. Basically, it is a UHF transmitter in the band 406.0-406.1 MHz, tunable to frequency channels of 3 KHz bandwidth each, transmission power is 5W+/−2 dB, PSK modulation and a bit rate of 400 bps. According to Cospas-Sarsat, the signal length is about 0.5 seconds and the nominal signal repetition rate is 50 seconds. Thus, in the preferred embodiment of the invention, the nominal "high transmission power" is set to 5W and the nominal "low repetition rate" is set to 50 seconds; these parameters are applied to the second group of successive signals, in compliance with the Cospas-Sarsat specifications. Yet, differently than Cospas-Sarsat, the PLB according to the present invention is configured to transmit, upon activation, a first group of successive signals, having a lower transmission power and higher repetition rate, not complying with the present Cospas-Sarsat specifications. As a non limiting example, the nominal "low transmission power" is set to 0.1 W, and the nominal "high repetition rate" is set to 5 seconds.

Preferably, the first group signals use the same RF band as the second group signals, however, it is also possible, especially due to regulation restrictions, that the first group signals use another frequency band, typically an unlicensed band close to the 406 MHz licensed band. Two such non limiting examples are 433 MHz and 390 MHz; then, the "low transmission power" would probably be lower, due to regulation restrictions, for example set to 10 mW.

The signal payload in the preferred embodiment of the present invention is according to Cospas-Sarsat specifications (web link indicated above), mainly containing the PLB Identification Data (ID) and its location coordinates. The location data is provided by the GPS decoder, and the preferred embodiment signal also takes about 0.5 seconds of transmission. Each PLB is programmed with a unique ID, stored in its non volatile EPROM.
  d) a control receiver with a matching antenna, configured to be communicated by the LMS (but possibly also by other devices), mainly to enable deactivation of the PLB upon a false alarm or upon accomplishing a rescue. Preferably, this control receiver is a Bluetooth integrated radio chip (and the same applies to the control transmitter in the LMS). Such chips are well known in the art, for example, the BlueCore IC family provided by CSR, such as—http://www.csr.com/products/bc6rom_spec.htm. This control receiver may be further configured to communicate other commands or messages or data from the LMS or even from the RMS, either directly or via the LMS. Such communications may include deactivation/activation commands; acknowledgments to the PLB transmission; controlling the transmission power and repetition rate of the PLB; providing the PLB with information about the LMS status or position.
  e) an Input/Output interface; this mainly implements the man-machine interface (MMI), enabling a user to input commands to the PLB, and the PLB to output status indications to a user. For operational purposes, no user input is configured, in order to enable automatic operation, and prevent undesired inputs. In another embodiment, a momentarily deactivation button is provided. Regarding the output, three low power leds are provided, indicating: i) activation status; ii) transmission status (blinks some seconds before transmission and lights constantly during the transmission); iii) acknowledgement of a PLB transmission by the RMS or LMS.

For testing and maintenance purposes, the PLB uses the same Bluetooth control receiver (actually a transceiver) to upload a new software version, test, control PLB parameters, control and read the GPS status, etc.

f) a water detecting sensor. Such sensors are also known in the art and been integrated in many systems. One such family of sensors/detectors is "Water Alert", provided by Dorlen, basically described in—http://www.dorlenproducts.com/water.htm. These sensors are designed to detect the presence of water, yet not activate due to high humidity and neither be affected if submerged in water for short periods. Specifications may be accessed through—http://www.dorlenproducts.com/spec.htm.

PLB Activation

The PLB may be activated manually, yet preferably it is activated automatically, by means of at least one sensor comprised in or coupled to the PLB, configured to detect a change in an environmental parameter reading, such as: temperature; humidity; acceleration; PH; air pressure; water pressure; illumination; sound; position; electromagnetic radiation; this change can be measured relatively to a previous reading at the PLB or to a reading at the LMS which is communicated to the PLB control receiver. In the preferred embodiment, a water detecting sensor is comprised in the PLB for activation purposes, as shown in FIG. 2.

PLB Deactivation

The PLB can be configured with direct means enabling a user to momentarily deactivate it, but preferably not, preventing unintentional deactivation, particularly in distress situations. The PLB is configured for a wirelessly remote control deactivation, typically conducted by the LMS operator. Otherwise, the PLB is deactivated when its battery drains out. In FIG. 2, a control receiver is shown, configured to receive and execute a deactivation command sent from the LMS, according to the preferred embodiment of the PLB. Upon deactivation, the PLB is preferably configured to disable its next activation for a predefined period of time, in order to avoid false alarms.

PLB Transmission Modes

Upon activation and until deactivation, the PLB is configured to successively transmit short signals, occasionally changing the signal transmission power and/or repetition rate. The PLB is configured to switch from one transmission mode to another, wherein each mode represents a different set of transmission power range and transmission repetition rate, as following.

Figure 3A:
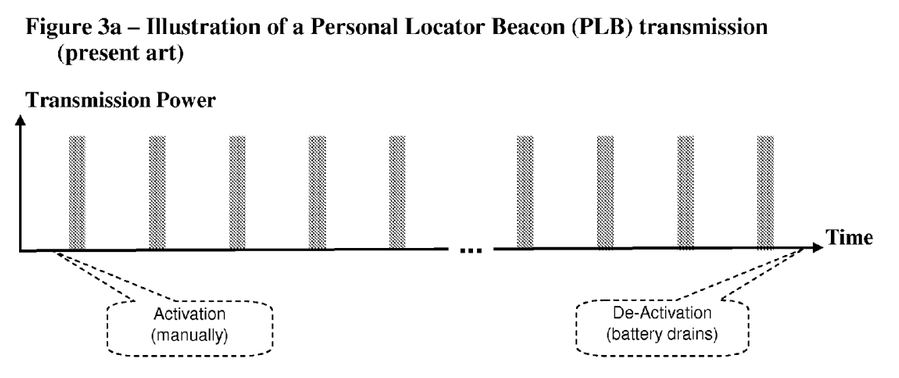
FIGS. 3a+3b+3c illustrate a PLB transmission, in terms of transmission power and transmission timing, according to the first embodiment.
Figure 3B:
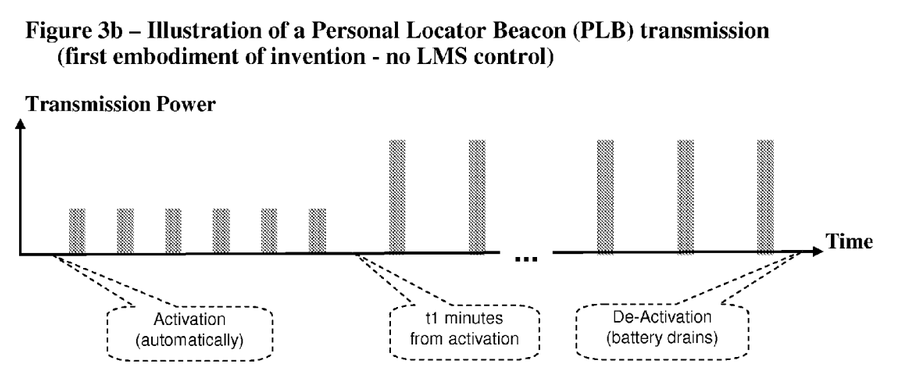
Figure 3C:
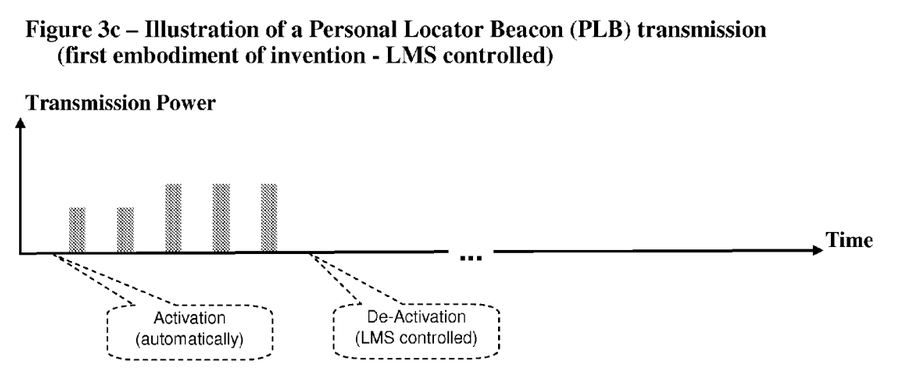

FIGS. 3a+3b+3c illustrate the PLB transmission modes, in terms of transmission power and transmission timing (not in scale).

FIG. 3a illustrates the PLB transmission according to the present art, showing a constant nominal transmission power (5 watts) and constant nominal repetition rate (50 seconds).

a) Upon activation, a first group of signals is transmitted, at a low transmission power and high repetition rate; this low transmission power is configured to enable determining the PLB location at the LMS but not at the RMS. Preferably, the "low transmission power" is 0.01-0.1 watts, and the "high repetition rate" is 5-10 seconds between successive transmissions.

FIG. 3b illustrates the PLB transmission according to the first embodiment of the present invention (no LMS control); it shows the first group of signals transmitted upon activation, for t1 minutes, and then switching to transmission of the second group of signals, described later. For example, t1 can be set to 20 minutes.

b) Among the first group of signals, it is possible to periodically increase a signal transmission power compared to a previously transmitted signal. Preferably, the PLB is configured to gradually increase the "low transmission power" from 0.01 W to 0.1 W.

FIG. 3c illustrates the PLB transmission according to the first embodiment of the disclosed invention (controlled by the LMS); it shows the first group of signals transmitted upon activation, until the PLB is deactivated (typically by a remote control command sent from the LMS—not shown); FIG. 3c also illustrates the variation in transmission power among the first group signals (though only one change in transmission power is shown).

c) Among the first group of signals, it is possible to refine (first refinement) the way a signal transmission power is increased compared to a previously transmitted signal. According to this first refinement, the PLB speed is determined by the coupled GNSS decoder, and a signal transmission power is increased according to the PLB speed, i.e. a higher PLB speed leads to a larger increment in transmission power. Also, the t1 period of time which determines when the PLB switches between modes, may also be adjusted according to the PLB speed. Clearly, as the PLB speed is higher, t1 is set lower.

d) Among the first group of signals, it is possible to further refine (second refinement) the way a signal transmission power is increased compared to a previously transmitted signal. According to this second refinement, the PLB speed is determined by the coupled GNSS decoder, the LMS speed is determined by another GNSS decoder comprised in the LMS, the LMS speed is communicated to the PLB via the control receiver, and the PLB determines the speed of separation between the PLB and the LMS, and then a signal transmission power is increased according to this separation speed; a higher separation speed leads to a larger increment in transmission power. Also in this case, t1 may be adjusted in real time according to the speed of separation between the PLB and the LMS. For example, t1 is set to 20 minutes for a speed of 5 knots, and to 10 minutes for a 20 knots speed.

e) If no deactivation command arrives to the PLB within a period of time t1 measured from activation, the PLB is configured to automatically switch to transmit a second group of successive signals, as shown in FIG. 3b, at a higher transmission power, preferably 5 watts (nominal), and at a lower repetition rate, preferably 50 seconds (nominal).

f) Upon been acknowledged by the RMS (described later), the PLB is configured to decrease the transmission repetition rate of successive signals, yet keep transmitting at the same high transmission power, preferably 5 watts nominally. Preferably, the repetition rate upon RMS acknowledgement is decreased to a nominal of 200 seconds or 800 seconds between successive transmissions.

PLB Transmission Acknowledgement

A transmission acknowledgement is paramount in a location system, since it enables adjusting some PLB parameters in real time, such as transmission power and repetition rate, in order to carefully trade off between detection/location probability and PLB battery life. Furthermore, a PLB bearer been in distress, could be mostly encouraged by such an acknowledgement, indicating that rescue is in process. The present invention discloses two methods to acknowledge a PLB transmission;

a) The RMS may be configured to acknowledge a PLB transmission by communicating the acknowledgement to the PLB GNSS decoder. This method typically requires that the GNSS be linked to the RMS or RMS network. The future operational Galileo is planned to be linked to the Cospas-Sarsat SAR satellite system, so this method of acknowledgement would be probably possible when coupling a Galileo compatible GNSS decoder to the PLB.

b) The RMS or LMS may be configured to acknowledge a PLB transmission through the PLB control receiver. The LMS may also be configured to relay such an RMS acknowledgement, yet preferably, an LMS acknowledgement is configured to be transmitted by the LMS control transmitter, detected by the PLB control receiver, and indicated to the user.

PLB External Interfaces

The PLB preferably provides no operational inputs, especially no manual activation or deactivation means, but three low power leds indicating: i) activation status; ii) transmission status (blinks 5 seconds before transmission and lights constantly during the transmission and 0.5 seconds before and after the transmission); iii) acknowledgement of a PLB transmission.

For testing and maintenance purposes, the PLB uses the same Bluetooth control receiver (actually a transceiver). The Bluetooth radio is configured to turn on upon activation of the PLB, enabling a compatible and nearby Bluetooth device to communicate with the PLB, deactivate its transmission but execute various tasks and read the PLB status. Among such tasks are: uploading a new software version to the microcontroller, programming the PLB unique identity data, testing the PLB hardware, controlling the PLB parameters, controlling and reading the GPS status.

PLB Transmission Frequencies

The PLB is configured to transmit some of its signals on different frequencies. This can be applied to signals in the same group (first or second) of successive signals, or/and to signals from different groups, i.e. signals that pertain to both the first and second groups of successive signals.

Preferably, the PLB is configured to automatically change its transmission channel, every hour, switching among Cospas-Sarsat standard channels in the 406.0-406.1 MHz band, in a cyclic way; for example, some of these channels are centered on 406.025 MHz, 406.028 MHz, and 406.031 MHz.

System Operation

When a person bearing a PLB falls overboard, the PLB is automatically activated upon sensing that it is submerged in water. On the PLB panel, a led indicating activation is turned on. Upon activation, the PLB starts transmitting successive signals, ending only if been wirelessly deactivated from the LMS, or when the PLB battery is drained out, whichever comes first.

Thus, the PLB bearer is not required to perform any operation to be located and rescued, and advantageously is able to be focused on his own survival.

Still, if the MOB is in a condition to monitor the PLB, and acts accordingly, he may improve his location chance by adjusting the antenna orientation (after verifying that it is not submerged in the water) when the PLB indicates that it is about to transmit, blinking the transmission led.

a) When the onboard LMS detects a PLB transmitted signal, it renders a loud sound and displays a clear message indicating "MOB". The LMS records the PLB position, and continuously updates it, then displays the direction and range to the MOB. Upon observing this alarm, a person onboard approaches the LMS and operates it.

The LMS operator alerts the skipper, which turns the vessel back to rescue the MOB according to the course and range indicated by the LMS. Meanwhile, the LMS operator invokes an acknowledgement, which is transmitted by the LMS. When this acknowledgement is received at the PLB, the acknowledgement led is turned on and if the MOB notes this indication, he would probably be quite encouraged.

On its way to rescue the MOB, the vessel is been continuously updated by the PLB and the LMS continuously adjusts the traveling directions. After locating the MOB and rescuing him, as the MOB is already safe onboard, the LMS operator invokes a deactivation command, which is wirelessly transmitted to the PLB and deactivates it, as shown in FIG. 3c. Then, the led indicating activation is turned off, as well as all other leds on the PLB panel, and a next PLB activation is denied for 1 hour.

b) If no LMS deactivates the PLB within a time period t1, the PLM increases its transmission power to a level enabling the PLB to be detected by the RMS, as shown in FIG. 3b. When the RMS detects a PLB transmitted signal, it parses its ID and location coordinates, and dispatches a SAR team towards that MOB. When the SAR team, onboard a vessel or helicopter provided with another LMS, gets close to the MOB, the SAR LMS detects the signals transmitted by the PLB. At this point, the SAR LMS operator acknowledges a PLB transmission in order to indicate the MOB that assistance is on its way. Then, the SAR LMS precisely directs the SAR team to locate and rescue the MOB. After the rescue operation is over, the MOB PLB is deactivated through the SAR LMS. Upon deactivation, the PLB activation is disabled for the next hour.

Description of a Second Embodiment of the Invention

General

According to a second embodiment of the present invention, the PLB is a location radio beacon, configured to be installed in 20 feet or 40 feet containers, carrying valuables on container ships or long haul tracks (semi-trailers or full trailers); the LMS is configured to be installed onboard a ship or track or in a port or hub or container depot; the RMS is at the headquarters of a shipping company, linked to a satellite communications system ("satcom"); the PLB is provided with a satcom transmitter, and the LMS is provided with a compatible receiver. Though the second embodiment PLB is not carried by a person, it is still named "Personal Location Beacon" (PLB), for consistency with the first embodiment terminology.

PLB Structure

Figure 4:
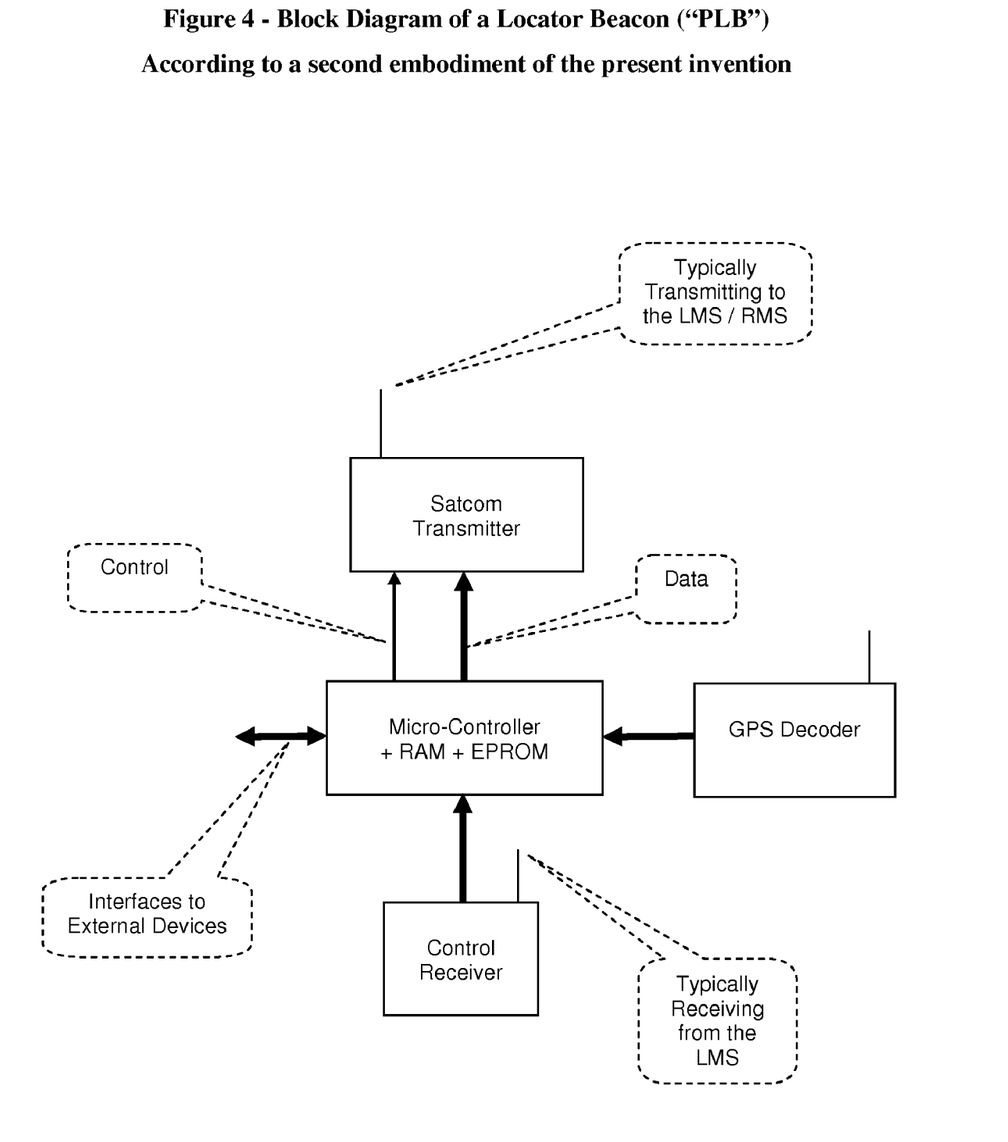

FIG. 4 shows a Block Diagram of the second embodiment PLB. As a skilled person may observe, the blocks in FIG. 4 are a sub set of the blocks in FIG. 2 (first embodiment PLB). Differently than in the first embodiment, the satcom transmitter of the second embodiment PLB is not Cospas-Sarsat compatible but linked to another constellation, e.g. Inmarsat. In addition, the second embodiment PLB does not comprise a water detecting sensor and neither a user interface (but contains a testing and maintenance interface as in the first embodiment). For other parts of the PLB, the first embodiment description is relevant also to this second embodiment.

PLB Activation

The second embodiment PLB is activated immediately upon installation.

PLB Deactivation

The second embodiment PLB is not deactivated as long as it is connected to a live power source.

PLB Transmission modes

As long as it is powered up, the second embodiment PLB is configured to successively transmit short signals, occasionally switching between two transmission modes, each mode representing a different set of transmission power range and transmission repetition rate.

Figure 5A:
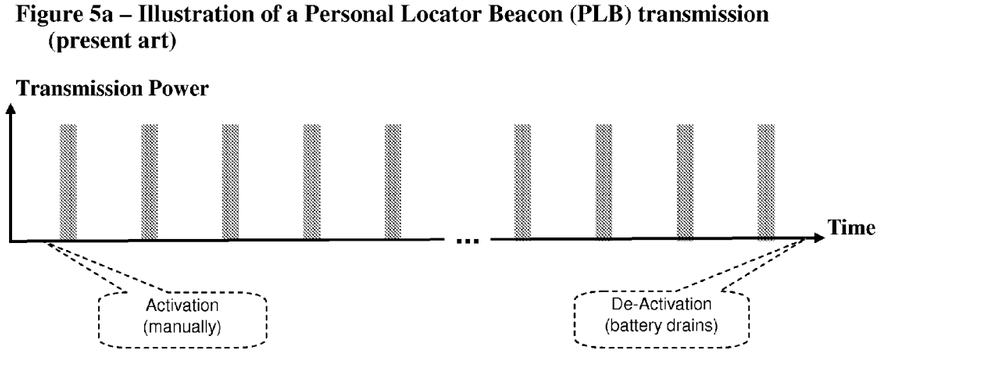
FIGS. 5a+5b illustrate a PLB transmission, in terms of transmission power and transmission timing, according to the second embodiment of the invention.
Figure 5B:
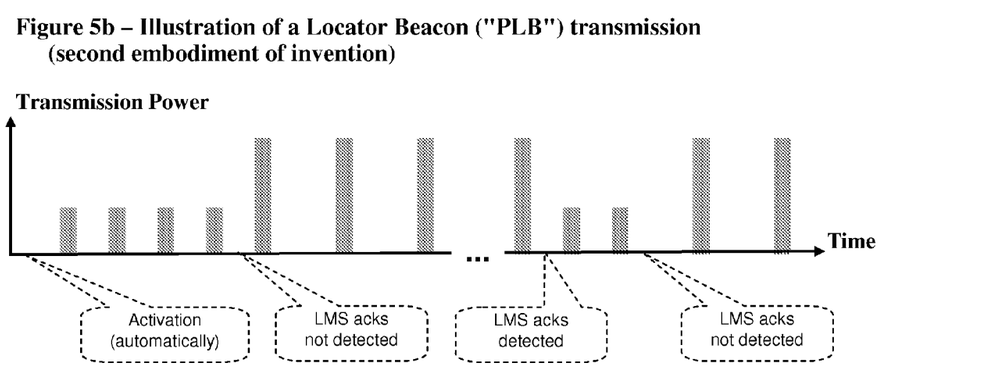

FIGS. 5a+5b illustrate the PLB transmission modes, in terms of transmission power and transmission timing (not in scale).

FIG. 5a illustrates the PLB transmission according to the present art, showing a constant nominal transmission power and constant nominal repetition rate (e.g. 1 hour).

FIG. 5b illustrates the PLB transmission according to the second embodiment of the invention; it shows the first group of low power signals transmitted until the PLB ceases detecting the LMS acknowledgements, then switching to transmit the second group of high power signals; when detecting again the LMS acknowledgements, the PLB switches back to transmit the first group of low power signals, and so on.

PLB Transmission Acknowledgement

The LMS automatically acknowledges every PLB signal it detects.

The PLB detects these acknowledgements via its control receiver, and accordingly sets its transmission mode. Basically, if enough successive acknowledgements are detected, the PLB is set to the low transmission power mode, and if enough successive PLB transmissions are not acknowledged, the PLB is set to the high transmission power mode. The decision to switch between modes is taken upon detecting or not detecting a number of successive acknowledgements (more than one), in order to avoid bouncing. In particular, it is possible to set one criterion to exchange modes in one direction, and a different criterion to exchange modes in the opposite direction. Preferably, the PLB is configured to leave the low transmission power mode upon not detecting a relatively small number of successive acknowledgements, yet leave the high transmission power upon detecting a relatively large number of successive acknowledgements.

System Operation

According to the second embodiment of the invention, the PLB is configured to operate automatically, not attended by a human operator. The LMS is also configured to operate automatically. The RMS may be attended by a user, usually to monitor the PLBs locations, however not necessarily providing any inputs to the system.

According to one aspect of the invention, a system according to the present invention is used to detect, locate and rescue a person that falls overboard a vessel (MOB). Each sailor/passenger is provided with a PLB, the LMS is installed onboard the vessel (and onboard SAR helicopters), and the RMS is part of a SAR satellite system. Upon MOB event, the PLB is activated, first at a low transmission power. If the LMS detects these signals, it immediately alarms the vessel team, rendering a strong siren and turning on red lights. Upon this MOB alarm, the vessel hopefully turns back, constantly guided by the LMS to the updated location of the MOB, and in due course rescue the MOB. Upon rescue, the LMS operator deactivates the PLB of the recently rescued MOB. If the vessel does not turn back to rescue the MOB, for any reason (e.g. single handed vessel, LMS failure), after 20 minutes, the PLB turns to transmit high power signals. Detecting the PLB signals at the RMS, immediately determines an emergency situation, therefore, the RMS operators dispatch a SAR team, through the nearest shore station relevant to this MOB location.

According to a different aspect of the invention, a system according to the present invention is used by a group of skiers. Each skier is provided with a PLB, the ski instructor is provided with the LMS and the RMS is installed at the ski patrol office. Upon activation, each PLB routinely reports to the LMS, in the low transmission power mode. In case that a skier- gets far away from its instructor, for a significant time, no LMS acknowledgements are detected at the PLB. Then, the PLB, upon not detecting LMS acknowledgements for a while, switches over to the high power transmission mode. Transmitting at this high power mode, the RMS detects the PLB signals, interprets these signals as indicating an emergency situation, and dispatches the ski patrol to SAR the skier. If the PLB is not been deactivated within a day, it means that the skier was not located and rescued by the ski patrol. Then, the PLB switches to a very low repetition rate of signal transmission, actually waiting to be approached by a nearby LMS. When an interrogation from an LMS is detected at the PLB control receiver, the PLB increases its transmission repetition rate, improving the chance to be located by the LMS, and hopefully enabling the rescue of the skier.

According to another aspect of the invention, a system according to the present invention is used by a group of tourists. Each tourist is provided with a PLB, the tourist guide is provided with the LMS and the RMS is installed at the tourist office. Upon activation, each PLB routinely reports to the LMS, in a low transmission power mode. In case that a tourist gets away from the guide, significantly distant and for a considerable period of time, the guide's LMS does not detect this PLB signals and consequently does not acknowledge its signals. Then, the PLB, upon not detecting LMS acknowledgements for a while, switches over to the high power transmission mode. Transmitting at this high power mode, the RMS detects the PLB signals, and contacts the tourist guide, indicating where the lost tourist is.

The invention is further directed to a Personal Locator Beacon (PLB), for a location system comprised of said PLB, a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:

a) transmit a first group of said successive signals, upon activation, at a low transmission power and at a high repetition rate, said low transmission power configured to enable determining the PLB location at the LMS but not at the RMS;

b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS;

The invention is also directed to a method for locating a Personal Locator Beacon (PLB) by a local monitoring station (LMS) and by a remote monitoring station (RMS), comprising the steps of:

a) configuring said PLB to transmit successive signals, upon activation;

b) configuring said LMS and RMS to determine the PLB location, from data derived from said signals;

c) transmitting a first group of said successive signals, upon activation, at a low transmission power and at a high repetition rate, said low transmission power configured to enable determining the PLB location at the LMS but not at the RMS;

d) transmitting a second group of said successive signals, after transmitting said first group of said successive signals, at a high transmission power, higher than said low transmission power, and at a low repetition rate, lower than said high repetition rate, said high transmission power configured to enable determining the PLB location at the RMS;

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A location system, comprising a Personal Locator Beacon (PLB), a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:
    a) transmit a first group of said successive signals, upon activation, at a low transmission power and at a high repetition rate, said low transmission power configured to enable determining the PLB location at the LMS but not at the RMS;
    b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS.

2. A system according to claim 1, wherein said RMS is accessed by said PLB via a satellite orbiting above the globe, or via a wide area network (WAN), including a cellular network.

3. A system according to claim 1, wherein said PLB activation is configured to be triggered automatically by means of at least one sensor comprised in or coupled to the PLB.

4. A system according to claim 3, said sensor configured to sense an environmental change, at least one of: temperature; humidity; acceleration; PH; air pressure; water pressure; illumination; sound; position; electromagnetic radiation; wherein this change is relative to a previous reading at the PLB or to a reading at the LMS.

5. A system according to claim 1, wherein among said first group of said successive signals, at least one signal is configured for a higher transmission power compared to a previously transmitted signal.

6. A system according to claim 1, wherein said PLB further comprises or is coupled to a Global Navigation Satellite System (GNSS) decoder, said PLB configured to acquire position data from this decoder, and reflect said data in said successive signals, in addition to identity data related to the PLB.

7. A system according to claim 6, said GNSS decoder further configured to provide the PLB speed, wherein among said first group of said successive signals, at least one signal is configured for a higher transmission power compared to a previously transmitted signal, and wherein the difference between the transmission power of these couple of signals is bigger for a higher PLB speed.

8. A system according to claim 6, wherein said RMS is configured to acknowledge the PLB transmission by communicating the acknowledgement to the PLB via said GNSS decoder.

9. A system according to claim 1, said RMS configured to acknowledge the PLB transmission, wherein upon been acknowledged by the RMS, the PLB is configured to decrease the transmission repetition rate of successive signals.

10. A system according to claim 1, said PLB further comprising a control receiver and said LMS further comprising a compatible control transmitter, said control receiver configured to provide the PLB with control signals, transmitted from the LMS and/or the RMS, said control signals configured for at least one of: a) deactivating and/or activating the PLB; b) controlling the transmission power and repetition rate of the PLB; c) providing the PLB with information about the LMS status or position; d) acknowledging the PLB transmission.

11. A system according to claim 10, said PLB further comprising a GNSS decoder configured to provide the PLB location, said LMS further comprising a GNSS decoder and configured to communicate its location to the PLB, wherein among said first group of said successive signals, at least one signal is configured for a higher transmission power compared to a previously transmitted signal, and wherein the difference between the transmission power of these couple of signals is bigger for a higher speed of separation between the PLB and the LMS.

12. A system according to claim 10, wherein said PLB is configured to disable its activation for a predefined period of time after been deactivated.

13. A system according to claim 1, wherein said PLB is a distress radio beacon, said second group of said successive signals compatible with the Cospas-Sarsat satellite Search and Rescue (SAR) system, as required from a Cospas-Sarsat Personal Locator Beacon (PLB) or Emergency Position Indicating Radio Beacon (EPIRB) or Emergency Locator Transmitter (ELT).

14. A system according to claim 1, wherein said PLB is further configured to be carried by or attached to a person onboard a vessel, said LMS configured to be installed onboard the same vessel, said RMS configured to be accessed by the PLB via a satellite orbiting around the globe, and said PLB is configured to be activated when said person falls overboard.

15. A system according to claim 1, said PLB further comprising means indicating a user at least one of: a) whether the PLB is activated or deactivated; b) when the PLB is about to transmit and/or actually transmitting, c) acknowledgement received from an RMS or an LMS upon detecting a PLB signal.

16. A system according to claim 10, wherein upon activation, said PLB is configured to receive control signals that deactivate its transmission and put it in maintenance mode, enabling at least one of: a) downloading a software version; b) programming identity data; c) setting specific operational parameters; d) performing a test.

17. A system according to claim 1, said PLB further configured to transmit at least two of said signals on different frequencies, wherein these two signals are: a) part of said first group; or b) part of said second group; or c) one is from the first group and the other is from the second group of signals.

18. A system according to claim 1, wherein said PLB is attached to an object to be located, one of: person, animal, pet, vehicle, weapon, ammunition, valuable asset.

19. A Personal Locator Beacon (PLB), for a location system comprising a PLB, a local monitoring station (LMS) and a remote monitoring station (RMS); the PLB comprising a transmitter configured to transmit successive signals, upon activation; the LMS and the RMS configured to determine the PLB location, from data derived from said signals; the PLB further configured to:
  a) transmit a first group of said successive signals, upon activation, at a low transmission power and at a high repetition rate, said low transmission power configured to enable determining the PLB location at the LMS but not at the RMS;
  b) transmit a second group of said successive signals, after transmitting said first group of said successive signals, at a high transmission power, higher than said low transmission power, and at a low repetition rate, lower than said high repetition rate, said high transmission power configured to enable determining the PLB location at the RMS.

20. A method for locating a Personal Locator Beacon (PLB) by a local monitoring station (LMS) and by a remote monitoring station (RMS), comprising the steps of:

a) configuring said PLB to transmit successive signals, upon activation;
  b) configuring said LMS and RMS to determine the PLB location, from data derived from said signals;
  c) transmitting a first group of said successive signals, upon activation, at a low transmission power and at a high repetition rate, said low transmission power configured to enable determining the PLB location at the LMS but not at the RMS;
  d) transmitting a second group of said successive signals, after transmitting said first group of said successive signals, at a high transmission power, higher than said low transmission power, and at a low repetition rate, lower than said high repetition rate, said high transmission power configured to enable determining the PLB location at the RMS.

* * * * *